United States Patent
Melzer et al.

(10) Patent No.: US 8,867,680 B2
(45) Date of Patent: Oct. 21, 2014

(54) CIRCUITRY SYSTEM AND METHOD FOR CONNECTING SYNCHRONOUS CLOCK DOMAINS OF THE CIRCUITRY SYSTEM

(75) Inventors: Lars Melzer, Dresden (DE); Kay Hesse, Dresden (DE)

(73) Assignee: Intel Mobile Communications GmbH, Neubiberg (DE)

(*) Notice: Subject to any disclaimer, the term of this patent is extended or adjusted under 35 U.S.C. 154(b) by 585 days.

(21) Appl. No.: 13/026,505

(22) Filed: Feb. 14, 2011

(65) Prior Publication Data
US 2011/0216861 A1    Sep. 8, 2011

(30) Foreign Application Priority Data
Feb. 12, 2010 (EP) .................... 10153472

(51) Int. Cl.
*H04L 7/00* (2006.01)
*G06F 1/10* (2006.01)
*G06F 1/32* (2006.01)

(52) U.S. Cl.
CPC .............. *G06F 1/3203* (2013.01); *G06F 1/10* (2013.01); *G06F 1/3237* (2013.01); *Y02B 60/1221* (2013.01)
USPC .......................................................... 375/354

(58) Field of Classification Search
USPC .......................................................... 375/354
See application file for complete search history.

(56) References Cited

U.S. PATENT DOCUMENTS

| | | | | |
|---|---|---|---|---|
| 7,900,078 B1 * | 3/2011 | Manohar et al. | ............... | 713/375 |
| 2005/0008110 A1 * | 1/2005 | Lake et al. | .................... | 375/371 |
| 2005/0246613 A1 | 11/2005 | Blaauw et al. | | |

FOREIGN PATENT DOCUMENTS

GB    2450564 A    12/2008

OTHER PUBLICATIONS

European Search Report for EP 11154282.5 dated Jan. 7, 2013.

* cited by examiner

*Primary Examiner* — Michael Neff
(74) *Attorney, Agent, or Firm* — Schwegman Lundberg & Woessner, P.A.

(57) ABSTRACT

A clock domain separation device and a method for operating the device is provided for separating two clock domains of a bus system in a system-on-chip (SoC). The clock domain separation device is a hardware module that acts as a guarding between the two clock domains that contain either bus end, and is generally applicable with handshake-type bus protocols. The clock domain separation module allows for each clock domain to switch its clock on and off independently from the state of the other clock domains, without risking data loss or protocol violation.

5 Claims, 9 Drawing Sheets

SSL data transfers

2

CIRCUITRY SYSTEM AND METHOD FOR CONNECTING SYNCHRONOUS CLOCK DOMAINS OF THE CIRCUITRY SYSTEM

CROSS REFERENCE TO RELATED APPLICATIONS

This application claims priority of European patent application No. 10153472.5 filed on Feb. 12, 2010, the entire contents of which is hereby incorporated by reference herein.

FIELD AND BACKGROUND OF THE INVENTION

The invention relates to a circuitry system that comprises synchronous clock domains of a streaming data bus. The invention also relates to a method for connecting synchronous clock domains of such a circuitry system.

When building large Systems-on-a-Chip (SoCs), for example for use in mobile communication applications, designers will combine several IP blocks, also known as IP (intellectual property) cores, even possibly from different vendors, via well-defined bus interfaces.

A design requirement especially for mobile systems, but not restricted thereto, is to support clock-gating on a per-design-block (i.e. per-IP) basis to save power and increase battery life. In the case of an SoC for wireless communication applications, these building blocks are the various components of the system, such as for example a digital front end (DFE), a Tx unit, a shared RAM, a forward error correction (FEC) data unit, a fast Fourier transform (FFT) unit, a parameter estimation unit, equalizer unit, searcher unit, an FEC control unit and the like, which components include several data processing units and a local embedded controller. When gating off one block's clock, however, it must be made sure that the busses crossing the block boundaries will not violate their protocols, and will not suffer from data loss or integrity issues.

Since a bus between two blocks that belong to separate clock domains creates interdependency between these two clock domains, ensuring protocol consistency of this bus involves contribution from both clock domains. This also means that each clock domain, i.e. the respective local controller thereof, must know the gating state of the other domain. Conventionally, to go into a clock-off state for one domain required the following steps:

- determining that the local block is in some form of idle state and all communication across the bus has ceased
- informing the other block about the intention to switch off the local clock, so that the bus will not be activated during the clock-off period
- receiving the confirmation from the other block
- switching off the local clock It will be understood that this approach not only involves both sides of the bus, but also a higher protocol level than that of the bus itself. That means that both local controllers must actively process information about the clock state, hence software is involved. If one side of the bus wants to re-activate the bus, it must again carry out a similar protocol to make sure both sides have their clocks running, before actually transferring data over the bus.

It is an object of the invention to minimize system and software complexity of SoCs. A particular object of the invention is to provide means which allow two building blocks of an SoC to switch their clocks on and off independently while avoiding data loss and protocol violation.

BRIEF SUMMARY OF THE INVENTION

The present invention provides a circuitry system which comprises a first and a synchronous second clock domain of a streaming data bus system that employs a handshake-type transfer protocol, which circuitry system is characterized in that it further comprises a clock domain separation device connected into the streaming data link between the first and said second clock domains to connect the two clock domains and to enable the clock in the clock domains to be switched on and off independently from each other while maintaining data integrity of the streaming data. The invention also provides a method for connecting a first and a synchronous second clock domain of a streaming data bus system in a circuitry system.

The clock domain separation device is a hardware module that acts as a guarding between the two clock domains that contain either bus end. The invention is generally applicable with handshake-type bus protocols. The clock domain separation module may be transparently inserted into a transfer stream to guard two clock domains against each other.

The clock domain separation module of the invention allows for each clock domain to switch its clock on and off independently from the state of the other clock domain, without risking data loss or protocol violation. It accepts both asynchronous and synchronous reset. All outputs are registered with the synchronous free running system clock.

The clock domain separation module of the invention also allows switching of the clock with finer granularity as compared to prior art approaches, since no latency of the handshake-type protocol as described above in conjunction with prior art is incurred.

The clock domain separation module can be used to safeguard a streaming data link between two different clock domains that run synchronously, but can be clock-gated independently. The clock domain separation module provides frame integrity, prevents protocol violations, inconsistencies and data loss, even in case where an ongoing transfer is interrupted by one side gating off its clock.

BRIEF DESCRIPTION OF THE DRAWING FIGURES

Additional features and advantages of the present invention will be apparent from the following detailed description of a specific embodiment which is given by way of example only and in which reference will be made to the accompanying drawings, wherein.

DETAILED DESCRIPTION OF PREFERRED EMBODIMENTS

Figure 1:
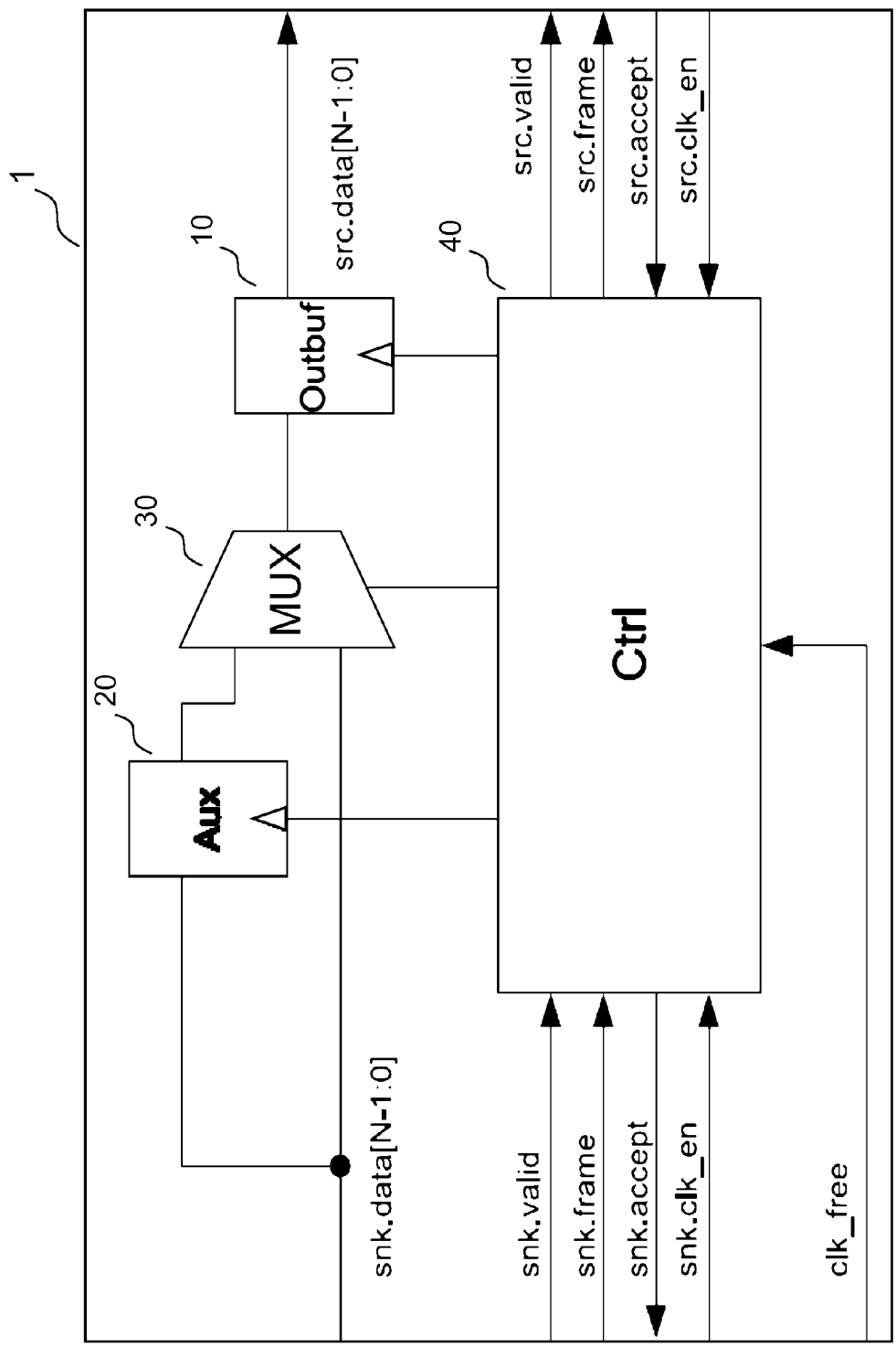
FIG. 1 shows a block diagram of one embodiment of the clock domain separation module according to the invention.

FIG. 1 shows a clock domain separation module 1 according to the invention generally consisting of an output data buffer 10, an auxiliary input buffer 20, a multiplexer 30, and control logic 40.

Figure 2:
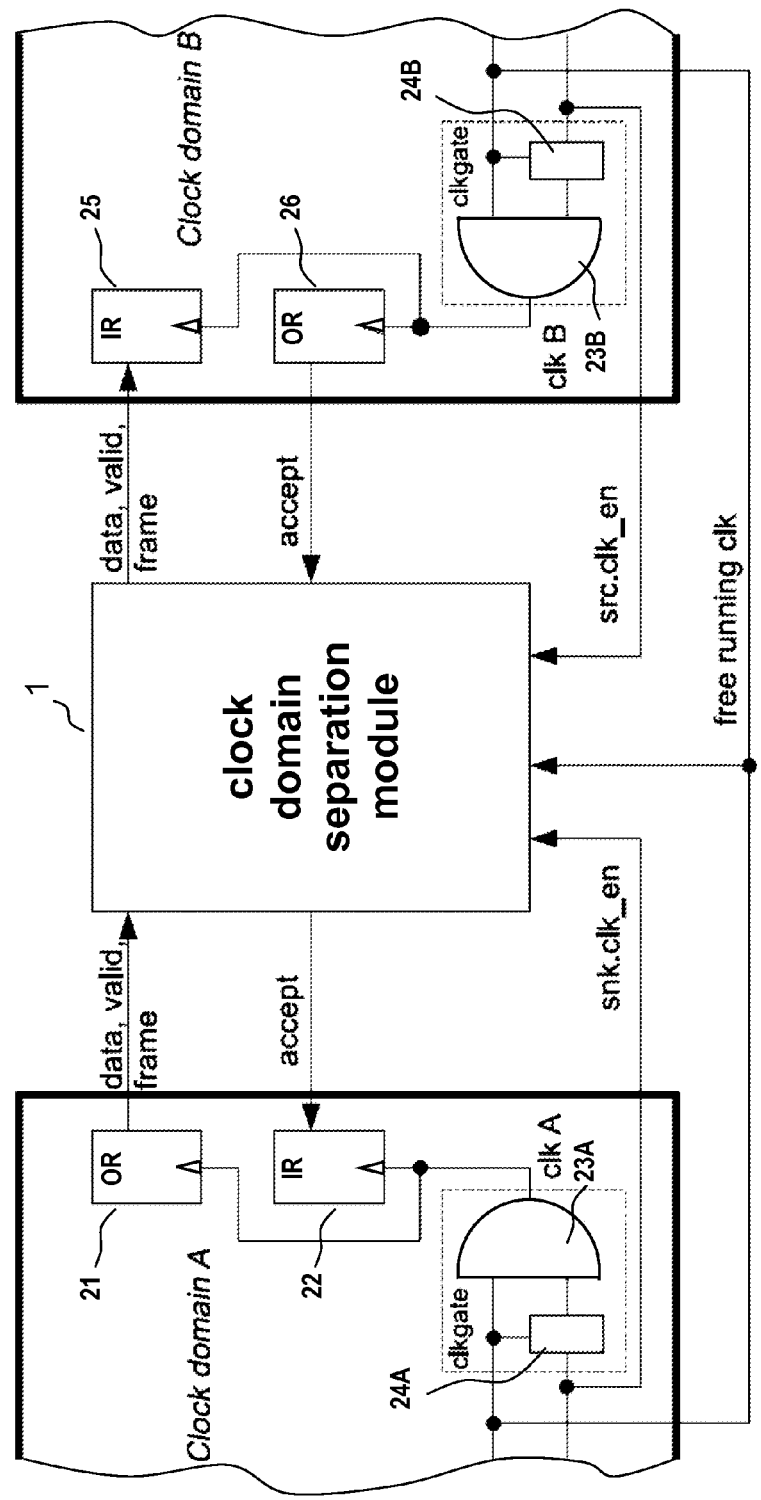
FIG. 2 shows a hierarchical view of the clock domain separation module arranged between two independent clock domains.

FIG. 2 shows, in a hierarchical view, the clock domain separation module 1 of the invention connected between two (synchronous) clock domains, A and B, and receiving clock gating control signals, snk.clk_en and src.clk_en, respectively, from both clock domains. These clock domains can comprise components of an SoC, so the clock domain separation module will be on the same hierarchical design level as the components themselves. In FIG. 2, clock domain A is only exemplified by an output register OR, 21, an input register IR, 22, and a clock A gate (clkgate clk A), and clock domain B is only exemplified by an input register IR, 25, an output register OR, 26, and a clock B gate (clkgate clk B), to not obstruct the invention. Each of the clock gates comprises an AND gate, 23A and 23B, respectively, and a latch, 24A and 24B, respectively. Latches 24A and 24B do not produce a clock delay, passing a signal when clk en=high and holding the signal when clk en=low. Output registers 21, 26 and input registers 22, 25 may be implemented by 1 bit flip-flops that produce a 1 clock cycle delay. Clock domain separation module 1 receives, at its sink interface, streaming data from a data source located in clock domain A, and outputs, at its source interface, streaming data to clock domain B. Data streaming is performed using a handshake-type transfer protocol.

As is well known, with a handshake-type protocol the transmitting entity and the receiving entity synchronize via direct acknowledgment signals. A transmitting party or data source signalizes to be ready for transmission when data are to be sent, and a receiving party or data sink signalizes to be ready for reception when it can or want to process new data. Data transfer does not start unless both the source is ready to transmit and the sink is ready to receive.

In the exemplary embodiments shown in the drawings, a ready for transmission condition is signaled by the "valid" signal, and a ready for reception condition is signaled by the "accept" signal.

Again referring to FIG. 1, control logic 40 is connected to data output buffer 10 via clock enable control line "c", to auxiliary input buffer 20 via clock enable control line "a", and to multiplexer 30 via 1 bit control line "b". Auxiliary input buffer 20 and multiplexer 30 each have a data input connected to the same data line to receive a data stream from the data source of clock domain A. The data output of auxiliary input buffer 20 is connected to a second data input of multiplexer 30. The data output of multiplexer 30 is connected to data output buffer 10, and the data output of the data output buffer is connected to a data output line to transmit data to a data sink in clock domain B.

For a proper understanding of the operation of clock domain separation module 1 it is important to note that module 1 introduces a latency of one clock cycle in forward and backward transfer directions. That means, the snk.valid signal received at the sink interface side of the module 1 is translated into the src.valid signal which is presented at the source interface side of module 1 at the next clock cycle. Vice versa, the src.accept signal received at the source interface side of module 1 is translated into the snk.accept signal which is presented at the sink interface side of module 1 at the next clock cycle.

The data and control signals featuring in FIGS. 1 and 2 are listed in Table 1 below:

TABLE 1

| Signal | Input/Output | Description |
|---|---|---|
| clk_free | I | free running system clock |
| snk.clk_en | I | sink side clock enable, high active |
| src.clk_en | I | source side clock enable, high active |
| snk.data | I | sink interface, data |
| snk.valid | I | sink interface, valid |
| snk.frame | I | sink interface, frame |
| snk.accept | O | sink interface, accept |
| src.data | O | source interface, data |
| src.valid | O | source interface, valid |
| src.frame | O | source interface, frame |
| src.accept | I | source interface, accept |

In one embodiment of the invention, data signals snk.data and src.data have a width of N bits, as indicated in FIG. 1 by [N−1:0]. All other signals listed in table 1 are single bits.

The frame signal is optional and will be explained in conjunction with FIG. 9 and with one embodiment of the inventive method illustrated in FIG. 8.

In one embodiment, clock domain separation module 1 uses a generic parameter for the streaming data width N. Furthermore, a generic parameter controls whether the clock domain separation module uses the frame signal or not.

The clock domain separation module of the invention does not require any higher protocol level anymore. Hence it does not contain any software configurable registers, so system and software complexity is considerably minimized.

Referring to FIGS. 3-8 in conjunction with FIG. 1, the behavior of clock domain separation module 1 will now be described in detail for several operation conditions.

Figure 3:
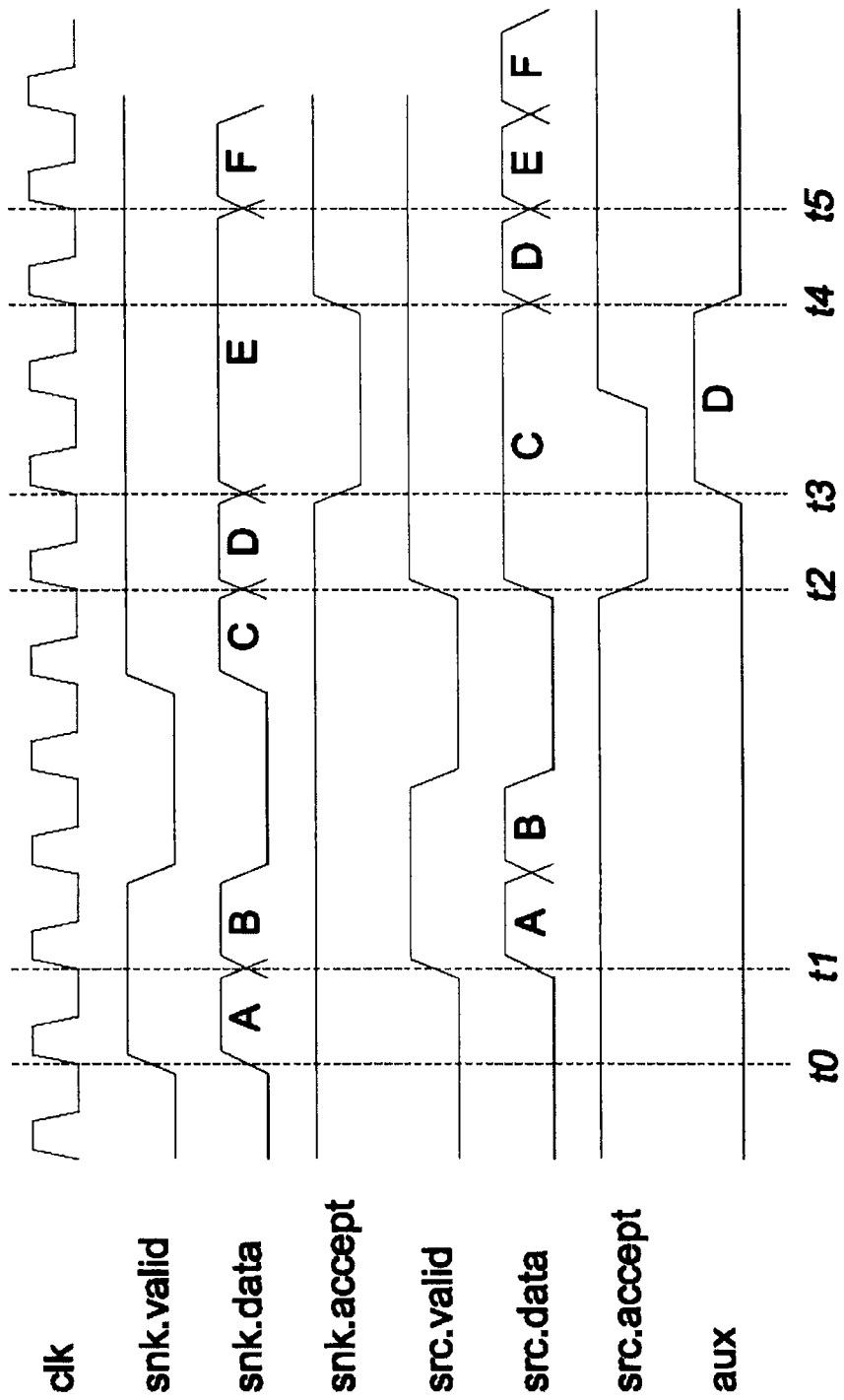
FIG. 3 illustrates data transfer with both clocks of two independent clock domains active.

FIG. 3 illustrates normal transfer while both clocks are running. In other words, FIG. 3 shows the behavior of the clock domain separation module when both sink and source side clocks are running and data are transferred. Due to the fact that all outputs are registered, there is a latency of one clock cycle in forward (data, valid, frame) and backward (accept) direction. This is illustrated in FIG. 3. At time t0 the sink interface of module 1 receives the first data element, "A", which is presented to the source interface of clock domain separation module 1 at time t1. An important consequence of the one cycle delay in backward direction is the need for an additional buffer stage, i.e. auxiliary input buffer 20 as shown in FIG. 1. This is necessary to capture incoming data (data element "D" at "aux" in FIG. 3) during the cycle when the source interface of module 1 already samples its accept signal as low (src.accept at time t2 in FIG. 3) and this deassertion is forwarded to the sink interface (snk.accept at time t3). The auxiliary input buffer 20 provides the buffered data (data element "D" in FIG. 3) at the source when it samples the accept signal high again (snk.accept at time t4) and thus bridges the time the sink can deliver the next data (data element "E" at time t5). Properly speaking, at time t4 control logic 40 prompts multiplexer 30 to pass the data applied at its input "A" to output buffer 10 which in turn outputs data element "D" in registration with the clock enable signal received via control line "c".

Usually, clock gating in either of the clock domains would only happen when there is no transfer going on. However, the clock domain separation module still has to handle the transfer of control signals (src.valid, src.frame and snk.accept) appropriately to prevent inconsistent states or data loss once either side is clocked again.

In a preferred embodiment, the clock domain separation module is even able to handle clock gating shutting off one side during a data transfer. Since both sink and source side clock might be gated off at the same time, the clock domain separation module is clocked with a free running clock. The clock domain separation module receives the clock gating control signals (snk.clk_en and src.clk_en) from both sides, as shown in FIGS. 1 and 2. It is assumed that these control signals switch clock gates with internal latches, i.e. the gated clock is switched at the cycle following the edge of the control signal. Some clock gating scenarios will now be discussed in detail with reference to FIGS. 4 through 8.

Figure 4:
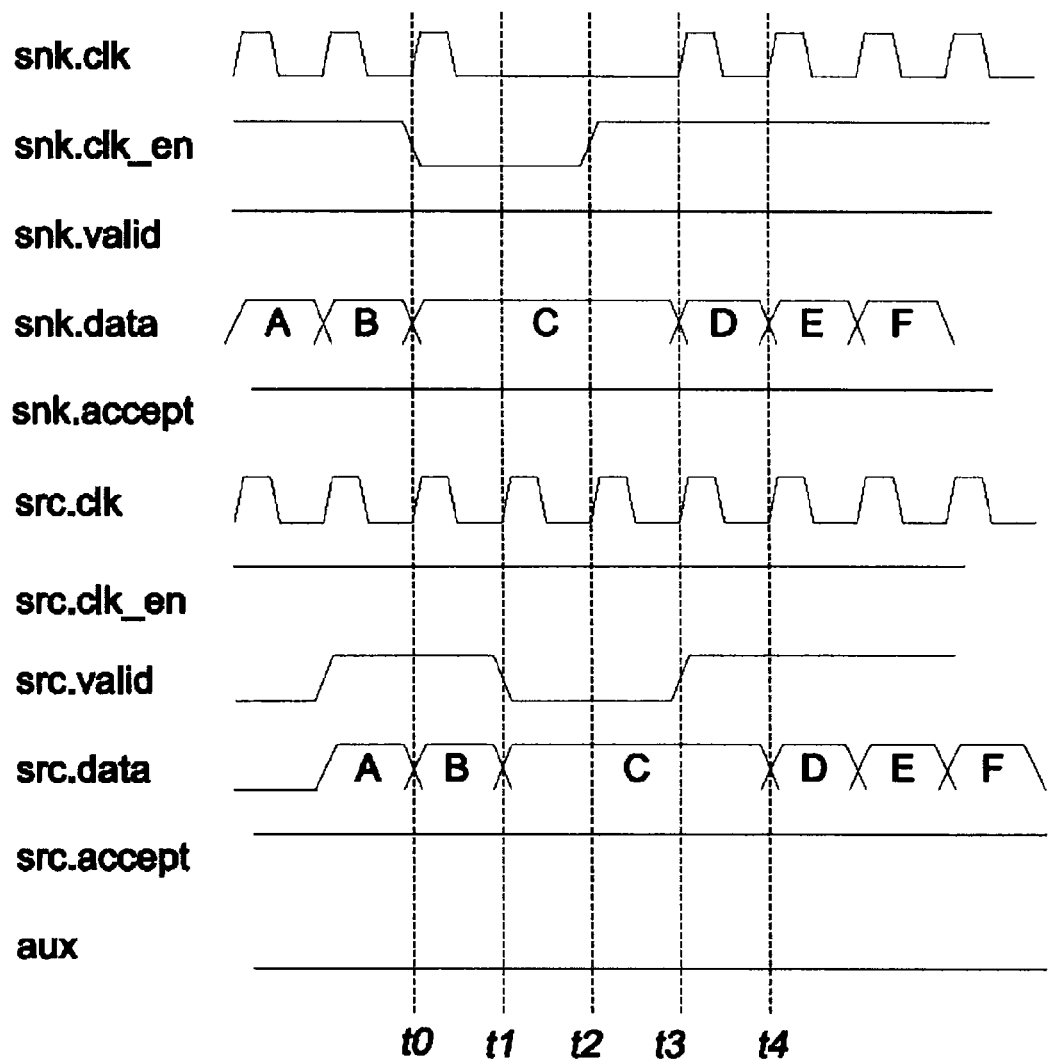
FIG. 4 illustrates data transfer with sink clock gated off.

FIG. 4 illustrates transfer with the sink clock (snk.clk_en) gated off. In other words, FIG. 4 shows the scenario when the sink interface side is shut off during a transfer. The clocks depicted are those as seen by the data producer (source) and consumer (sink), respectively. Clock domain separation module 1 works on its own free running clock. The sink side clock is disabled at time t0, therefore, from time t1 to t3 the sink clock is off. The gating with snk.clk_en is translated into the data valid signal src.valid, so the source will not present new data for the interval during which the sink clock is switched off. Therefore, data "C" is only marked valid at time t3 and would be consumed at time t4. In this scenario, additional auxiliary buffer 20 is not needed.

Figure 5:
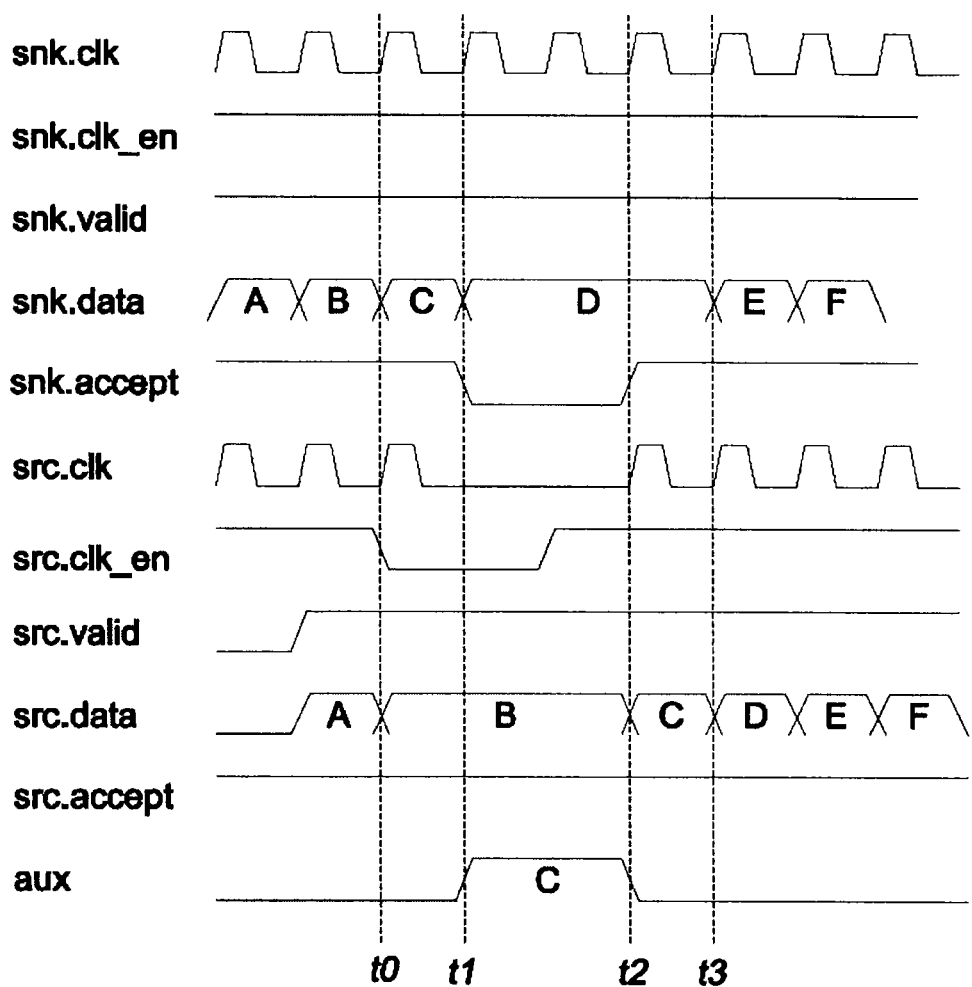
FIG. 5 illustrates data transfer with source clock gated off.

FIG. 5 illustrates transfer with the source clock (src.clk_en) gated off. In other words, FIG. 5 shows the scenario when the source side is shut off during a transfer. The source clock is disabled at time t0. This causes the accept signal at the sink side to deassert to avoid data loss. Due to the one cycle delay, auxiliary input buffer ("aux" and 20 in FIG. 1, respectively) must store the data already presented at that time (data element "C"). One cycle after the source side clock has been enabled again (time t2), the last data before the clock stop is now consumed (data "B" at src.data) and the auxiliary input buffer ("aux") is emptied from data element "C". At the same time, the sink side re-asserts accept again (snk.accept at time t2) and one cycle later (time t3) the next data (data element "D") is presented.

Figure 6:
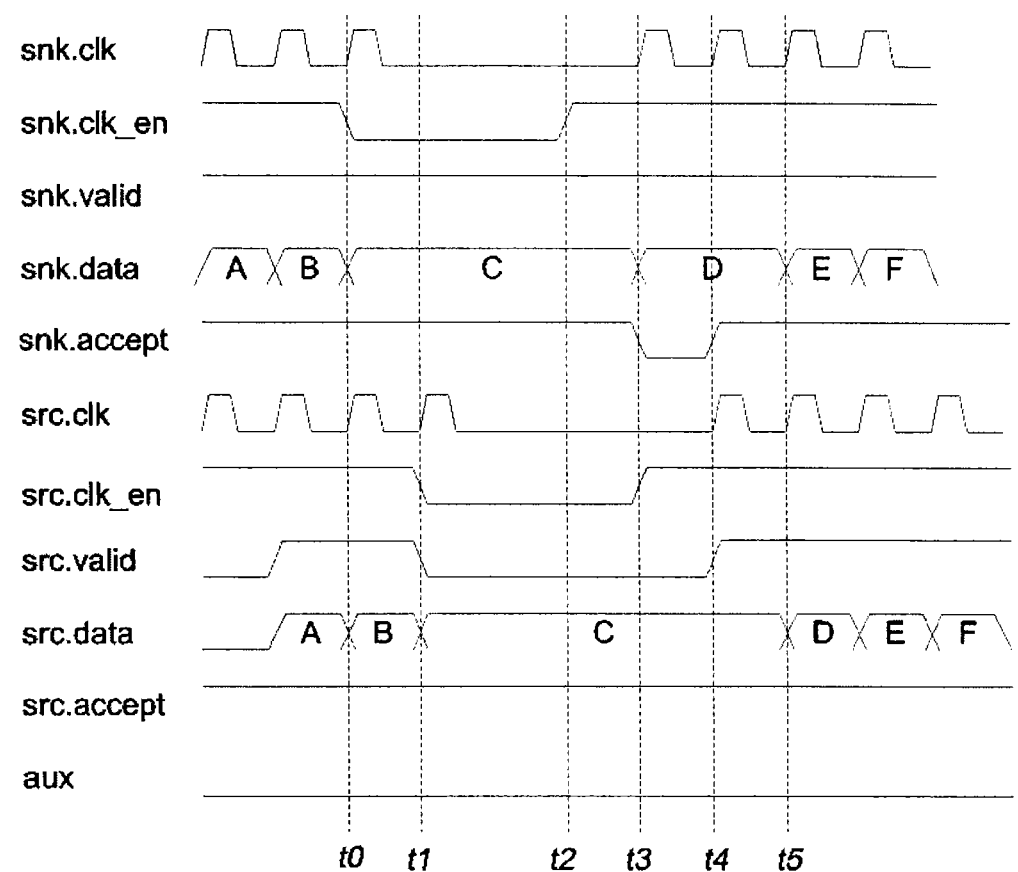
FIG. 6 illustrates data transfer with sink clock gated before source clock.
Figure 7:
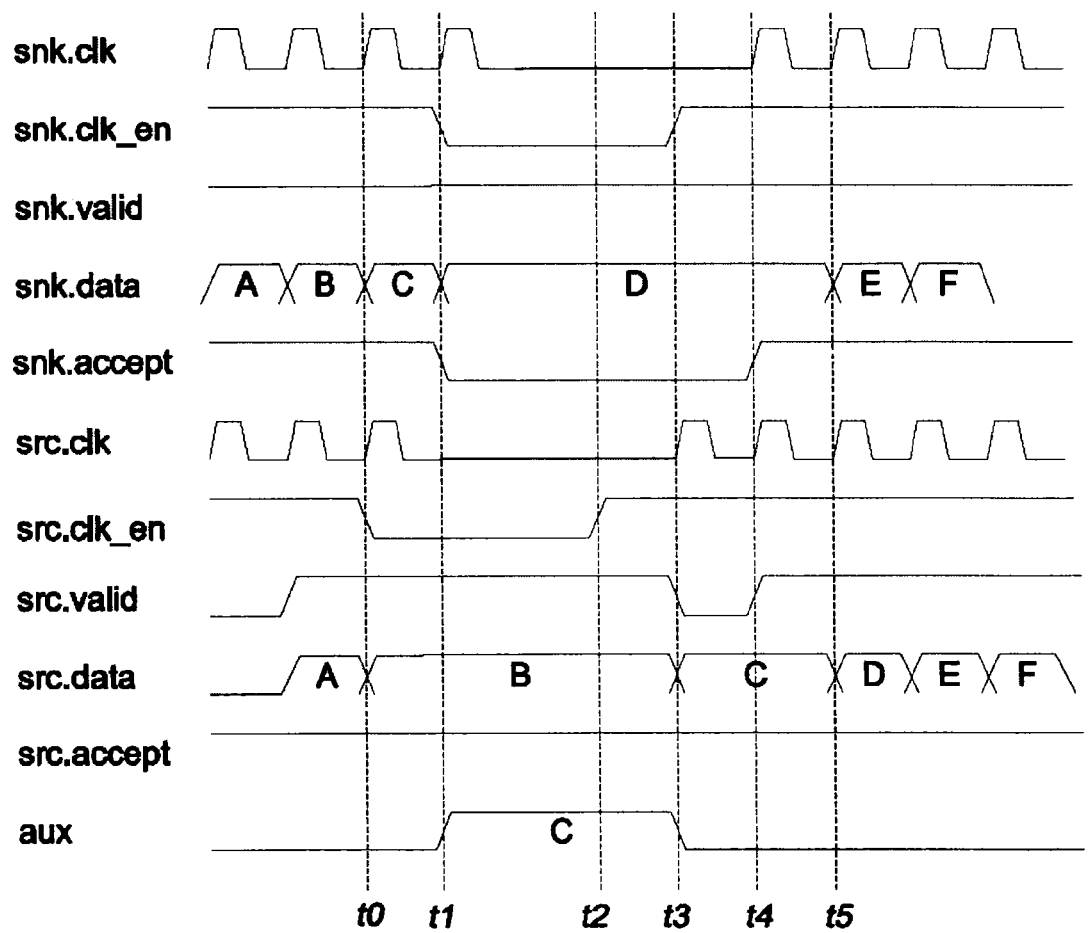
FIG. 7 illustrates data transfer with sink clock gated after source clock.

FIGS. 6 and 7 illustrate transfer with both clocks gated off. Although this might seem just like a combination of both above scenarios, there is an additional complexity to it: A transfer with the sink clock gated before source clock is illustrated in FIG. 6; and a transfer with the sink clock gated after source clock is illustrated in FIG. 7.

FIG. 6 shows a scenario where the sink clock (snk.clk_en) is gated off (at time t0) before the source clock (src.clk_en at time t1). Clock domain separation module 1 must translate these gating conditions into the corresponding transfer control signals. Therefore, it deasserts src.valid at time t1 due to the previous clock stop at the sink side. However, it does not deassert snk.accept one cycle after src.clk_en was deasserted at time t1, but only deasserts snk.accept one cycle after snk.clk_en has been re-asserted, namely at time t3. Similarly, src.valid is not re-asserted at time t3 (one cycle after re-assertion of snk.clk_en), but only at time t4, after re-assertion of src.clk_en. At time t5, data element "C" which was presented during the overlapping clock-off, is eventually consumed. Since sink side clock gating happened before source side clock gating, the additional auxiliary input buffer is not needed.

FIG. 7 shows the opposite case, with clock gating at the source side happening earlier. The disabling of the source clock src.clk_en at time t0 leads to deassertion of snk.accept at time t1. Since the next data element "C" was already presented at this time, it needs to be stored in auxiliary input buffer 20 ("aux"). The re-assertion of scr.clk_en at time t2 does not immediately lead to re-assertion of snk.accept, but only at time t4, once snk.clk_en has also been re-asserted at time t3. New data (data element "D") is then presented at time t5, after the sink side sampled its accept signal high again.

In a presently preferred embodiment of the invention, the clock domain separation module is responsible to maintain frame integrity, i.e. it ensures that all data is marked with a proper frame flag and that separate frames are distinguished (i.e. the inter-frame gap is not lost).

To this end, the applicant's Simple Streaming Link (SSL) data streaming transfer protocol is advantageously used which had been disclosed in EP application 10 197 315.4 entitled "A Method for High Speed Data Transfer".

Figure 9:
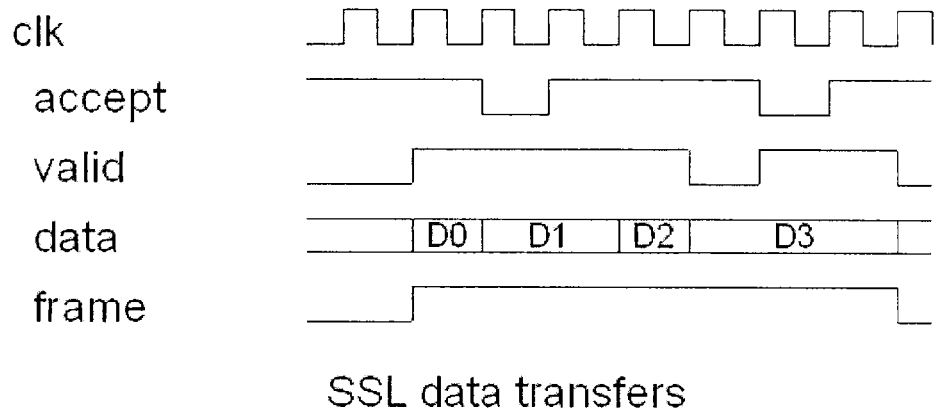
FIG. 9 shows the signals of a streaming data transfer protocol used in one embodiment of the invention.

FIG. 9 shows the streaming signals used according to the SSL transfer protocol for data transfer between and through a plurality of functional units of an SoC. SSL comprises four signals: data, valid, accept, frame. A data signal can have a width of multiple bits, e.g. 7, 16, 24, 32 bits. The valid/accept signals are similar to that of other handshake-type transfer protocols and are used to drive and stall the communication from source to sink. Source and sink can set or reset these signals at any time. Data is taken over if both are 'high' on the rising edge of the clock. Data source and data sink must have the same understanding of what the frame signal means. Data source and data sink, herein, can be any of the functional units of an SoC.

A "frame" in the sense of the SSL transfer protocol is a logical group or sequence of data, such as e.g. an OFDM symbol, a block of control data, a block of information data, etc. Data transfer only occurs if accept, valid and frame signals are high. In this case the frame signal marks the beginning and end of a data block transfer.

The source can set the valid and frame signals in advance. The sink can set the accept signal in advance. In case the frame signal is not used by a source, it can clamp the output to "high". In case a sink does not know how to interpret an incoming frame signal, it can be ignored.

During non-gated transfers, the frame signal of the data streaming protocol as depicted in FIG. 9 is just forwarded from sink to source with one cycle latency, as all other sink signals. If, however, the source side has gated off its clock and the sink side has inserted an inter-frame gap, then the clock domain separation module must take action.

Figure 8:
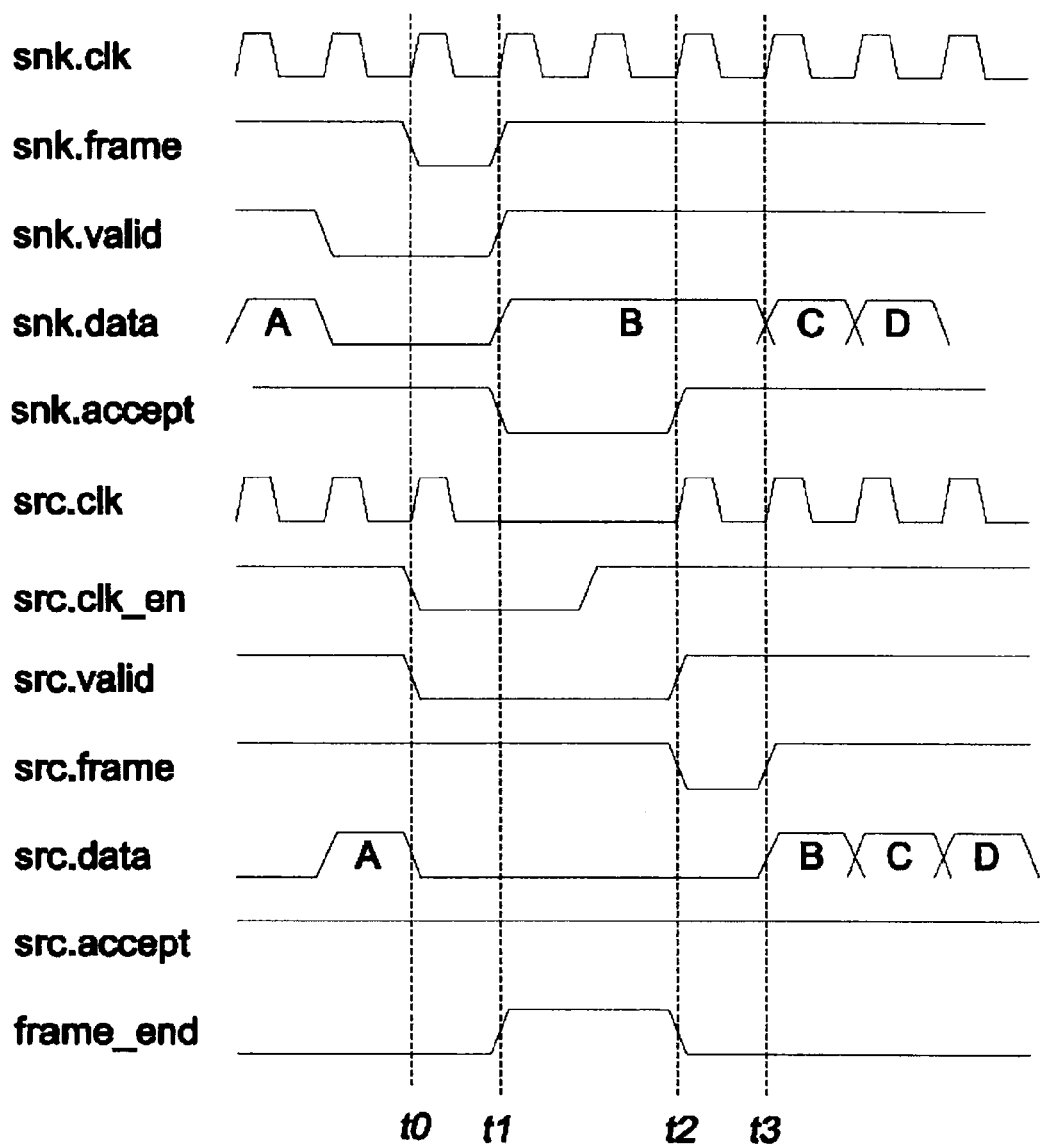
FIG. 8 illustrates data transfer with sink clock gated after source clock, additionally ensuring frame integrity.

FIG. 8 illustrates transfer with the sink clock gated after source clock. In particular, the figure shows a scenario where the source side gates off its clock (src.clk_en) at time t0, while the sink side concurrently inserts an inter-frame gap (snk.frame) between t0 and t1. Since the source side can only react upon this once its clock is switched on again, the clock domain separation module 1 needs to store this frame end condition in an internal marker flag (frame_end). Once the source side has restored its clock, the inter-frame gap is now inserted between time t2 and t3 (src.frame), and the marker (frame_end) is reset. Since the clock-off condition at the source side is translated into a deassertion of snk.accept, no data is lost, and frame integrity, i.e. data association to the frame signal, is maintained.

While FIG. 2 shows the clock domain separation module 1 of the invention as a stand-alone module connected between the two clock domains, the following configurations are also possible:

The clock domain separation module can be arranged in the sink side clock domain, forming an output guard.

The clock domain separation module can be arranged in the source side clock domain, forming an input guard.

Only one clock domain is actually gated. Then the other domain's clk_en input can be tied to high. In this case, the two hierarchy options mentioned before are still viable, although it would be preferable to arrange the clock domain separation module in the gated domain.

Figure 10:
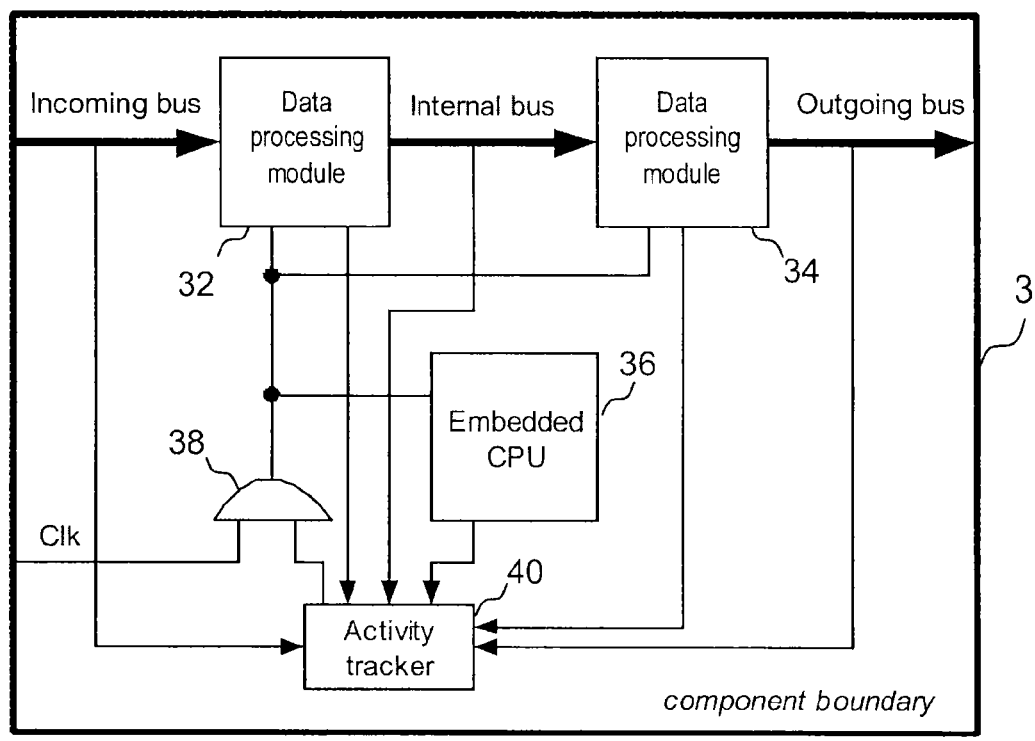
FIG. 10 shows an application example of clock gate control in a clock domain that can be used in conjunction with the invention in any of the clock domains shown in FIG. 2.

The clock domain separation module can advantageously be combined with the activity detection as described in the applicant's co-pending EP application entitled "Method and Device for Clock Gate Controlling". A clock domain, such as clock domains A and B of FIG. 2, may comprise one or more data processing blocks such as data processing component 3 shown in FIG. 10, which comprises data processing modules 32, 34 and may optionally comprise an embedded controller 36. Data processing component 3 further comprises an activity tracker 40. With the SSL transfer protocol illustrated in FIG. 9, the activity detection in activity tracker 40 of FIG. 10 can be reduced to the detection of a logical "1" of the frame signal. The frame signals from each of the data processing units 32, 34 and streaming data bus segments can be used as a busy indication and can be logically combined by activity tracker module 40 such as to output a clock disabling signal to clock gate 38 when all frame signals indicate absence of any data to be transferred or processed, and to output a clock recovering signal when at least one of the frame signals indicate the presence of data. In this way, the activity tracker can gate the clock at the root of the local distribution network. This will be independent of the local controller and will not require any software activity. This approach for automatic clock gate control by activity tracking provides several advantages, e.g. clock gate insertion on register transfer level (RTL) enabling verification on RTL level, high coverage and hierarchical clock gating.

The invention claimed is:

1. A circuitry system comprising a first clock domain and a synchronous second clock domain of a streaming data bus system that employs a handshake-type transfer protocol, wherein the circuitry system further comprises a clock domain separation device connected into a streaming data link between said first clock domain and said second clock domain to connect the first and second clock domains and to enable a clock in the first and second clock domains to be switched on and off independently from each other while maintaining data integrity of the streaming data, said device comprising:

a control logic having a sink interface for receiving control signals from and returning control signals to a data source arranged in said first clock domain, a source interface for transmitting control signals to and receiving control signals from a data sink arranged in said second clock domain, and a system clock input, a data output buffer, an auxiliary input buffer, and a multiplexer, wherein said control logic is connected to each of said data output buffer, auxiliary input buffer, and multiplexer, and wherein:

the auxiliary input buffer and the multiplexer each have a data input connected to a same data line to receive a data stream from said data source of the first clock domain, the auxiliary input buffer is operable to buffer data elements of a data stream that has been accepted during a clock cycle in which a non-accept condition of the data sink has been transferred from the source interface to the sink interface of the device a data output of the auxiliary input buffer is connected to a second data input of the multiplexer, a data output of the multiplexer is connected to the data output buffer, and a data output of said data output buffer is connected to a data output line to transmit data to said data sink of the second clock domain, and wherein the clock domain separation device introduces a latency of one clock cycle in forward and backward transfer directions.

2. The circuitry system of claim 1, wherein the auxiliary input buffer is operable to buffer data elements of a data stream in case a source interface side clock is gated off during transfer and a sink interface side clock remaining active or being gated off following shut-off of the source interface side clock.

3. The circuitry system of claim 1, wherein said handshake-type transfer protocol further comprises a frame signal which marks a beginning and an end of a logical group or sequence of data, and wherein, in case a frame end condition is signaled while a clock of the source interface side is gated off, the clock domain separation device is adapted to store the frame end condition in an internal marker flag until the source interface side clock has been restored so that data association to the frame signal is maintained over different clock domains.

4. The circuitry system of claim 1, wherein said clock domain separation device forms an output guard of the first clock domain in which the data source is located.

5. The circuitry system of claim 1, wherein said clock domain separation device forms an input guard of the second clock domain in which the data sink is located.

* * * * *